United States Patent [19]

Brandstetter et al.

[11] 4,435,541

[45] Mar. 6, 1984

[54] ANTISTATIC THERMOPLASTIC MOLDING MASSES CONTAINING STYRENE-ACRYLONITRILE GRAFTED POLYETHER

[75] Inventors: Franz Brandstetter, Neustadt; Juergen Hambrecht, Heidelberg; Bernhard Scharf, Schriesheim; Gerhard Lindenschmidt, Leimen; Josef Schwaab, Maikammer; Rudolf H. Jung, Worms, all of Fed. Rep. of Germany

[73] Assignee: Dr. Beck & Co. AG, Hamburg, Fed. Rep. of Germany

[21] Appl. No.: 361,862

[22] Filed: Mar. 25, 1982

[30] Foreign Application Priority Data

Mar. 28, 1981 [DE] Fed. Rep. of Germany ....... 3112428

[51] Int. Cl.³ .................. C08L 25/12; C08L 55/02; C08L 71/02

[52] U.S. Cl. .................................. 525/64; 525/63; 525/187; 524/504

[58] Field of Search ..................... 525/63, 64, 187

[56] References Cited

U.S. PATENT DOCUMENTS

| Re. 29,014 | 10/1976 | Pizzini et al. | 521/137 |
| 3,450,794 | 6/1969 | Ebneth et al. | 525/187 |
| 3,963,803 | 6/1976 | Tanaka et al. | 525/63 |
| 4,291,134 | 9/1981 | Hambrecht et al. | 525/187 |
| 4,315,081 | 2/1982 | Kobayashi et al. | 525/64 |

*Primary Examiner*—Carman J. Seccuro
*Attorney, Agent, or Firm*—Joseph D. Michaels

[57] ABSTRACT

Thermoplastic molding masses based on the copolymerization of styrene and/or α-methylstyrene and acrylonitrile, which may be modified to be impact resistant with rubberlike polymers, are made antistatic by adding 0.01 to 1.5 percent by weight of a graft polyol which is a polyhydroxy-polyalkylene polyether modified with styrene-acrylonitrile copolymers.

7 Claims, No Drawings

4,435,541

ANTISTATIC THERMOPLASTIC MOLDING MASSES CONTAINING STYRENE-ACRYLONITRILE GRAFTED POLYETHER

BACKGROUND OF THE INVENTION

1. Field of the Invention

This invention relates to antistatic thermoplastic molding masses based on copolymers of styrene and/or α-methylstyrene and acrylonitrile, such as styrene-acrylonitrile-copolymers (SAN polymers), styrene-acrylonitrile copolymers modified with butadiene rubber (ABS polymers), styrene-acrylonitrile copolymers modified with acrylate elastomers (ASA polymers), and styrene-acrylonitrile copolymers modified with EPDM rubber (AES polymers), optionally modified by rubberlike polymers, and containing as an antistatic agent a graft polyol which is a polyhydroxy-polyalkylene polyether modified with a styrene-acrylonitrile copolymer.

2. Description of the Prior Art

The addition of antistatic agents to thermoplastic molding masses based on vinyl aromatic-acrylonitrile-copolymers is part of the current state of the art. Suitable known antistatic agents include amines, amides, salts of quaternary ammonium bases, sulfonic acids, alkyl, aryl, alkylaryl sulfonates, phosphoric acids, alkyl, aryl or alkylaryl phosphates, polyoxyethylene polyoxypropylene copolymers, alkyl or arylethers and esters thereof, including inorganic as well as organic acid residues as acid components. The agents are added to suppress the dust accumulation on finished parts. Such antistatic agents used in thermoplastic molding masses are described, for instance, in German Pat. Nos. 1,244,398 and 1,258,083.

All of these molding masses have negative factors. The use of low molecular weight antistatic agents frequently results in the formation of a coating on the surface of molds and finished parts and reduced dimensional stability when exposed to heat. If oligomeric or polymeric antistatic substances are used, reduced impact strength and unfavorable processing properties occur.

A purpose of this invention was to find antistatic agents which are particularly compatible with vinyl aromatic-acrylonitrile copolymers and do not form a coating of the surfaces of molds and parts, do not reduce the thermal dimensional stability and the impact resistance of the finished parts, do not result in unfavorable processing properties and do not result in a clouding or discoloration of the finished parts and which at the same time have a very good antistatic behavior and must be used in small quantities.

It has been found that this problem is solved by the addition of a graft polyol, which is a polyhydroxy-polyalkylene polyether modified with styrene-acrylonitrile copolymers, to the molding mass.

SUMMARY OF THE INVENTION

This invention relates to an antistatic thermoplastic molding mass based on copolymers of styrene and/or α-methylstyrene and acrylonitrile, which contain as an antistatic agent 0.01 to 1.5 percent by weight of a graft polyol, said polyol being a polyhydroxy-polyalkylene polyether modified with styrene-acrylonitrile copolymers.

DESCRIPTION OF THE PREFERRED EMBODIMENTS

The copolymers of styrene and/or α-methylstyrene and acrylonitrile of the molding masses of this invention are part of the current state of the art. These are products such as SAN, ABS, ASA and AES polymers.

The copolymers may be a rigid component copolymer, i.e., consisting essentially of or consisting of styrene and/or α-methylstyrene and acrylonitrile and may have an acrylonitrile content of approximately 8 to 50 percent by weight of the copolymer. Preferred rigid component copolymers are styrene-acrylonitrile copolymers having from 8 to 50, more preferably from 20 to 40 percent by weight of acrylonitrile, α-methylstyrene acrylonitrile copolymers having from 25 to 35 percent by weight acrylonitrile and α-methylstyrene-styrene-acrylonitrile terpolymers having from 10 to 40 percent by weight acrylonitrile. Mixtures of rigid components may be used. The manufacture of these rigid component copolymers by copolymerization of the monomers in bulk solution, suspension or aqueous emulsion, is part of the current state of the art and is described, for instance, in the following U.S. Pat. Nos.: 3,747,899, 2,714,101, 2,727,884, 3,442,880, 3,288,731, 3,198,775, German Published Application No. 454,894 and German Published Application No. 2,559,069.

Also preferably used as rigid component copolymers are copolymers having a viscosity number of 40 to 150, preferably 50 to 100, and more preferably 50 to 85 as determined according to DIN 53 726; solution of 0.5 grams polymer in 100 milliliters of dimethylformamide.

Preferably used as the basis for the molding masses of this invention are the known rubber-modified copolymers which are copolymers of styrene and/or α-methylstyrene and acrylonitrile modified by rubberlike polymers. These are copolymerized graft polymer mixtures which are produced by polymerization of styrene and/or α-methylstyrene and acrylonitrile in the presence of a rubberlike polymer.

Suitable rubberlike polymers include polybutadiene, butadiene acrylate copolymers based on butylester of acrylic acid, and/or ethylhexylester of acrylic acid, or alkyl esters of polyacrylic acid, particularly those having 1 carbon atom to 8 carbon atoms in the alkyl radical, copolymers of butadiene, alkyl esters of acrylic acid and vinyl alkyl ethers, copolymers of ethylene, propylene and one diene component. As a rule the rubberlike polymer has a glass transition temperature below 0° C., preferably below −40° C. as measured by the DSC method, K. M. Illers, Makromolekulare Chemistry 127 (1969), 51.

Preferably the manufacture of the copolymerized graft polymer mixture is based on approximately 40 to 85 percent by weight of the rubberlike polymerizate and 15 to 60 percent by weight of a mixture of styrene and acrylonitrile having a weight ratio of 88:12 to 65:35.

The manufacture of the rubber-modified copolymers is part of the current state of the art and is described, for instance, in German Application Nos. 2,427,960, 1,811,882, 1,260,135, 1,238,207, 1,247,021, and U.S. Pat. No. 3,515,774.

The molding masses of this invention may also contain or consist of mixtures of the rigid component copolymers and the rubber-modified copolymers.

As additional components the molding masses may also contain commonly used additives or auxiliaries in generally used and effective quantities.

A significant factor of the invention is the addition of 0.01 to 1.5 percent by weight of a graft polyol which is a polyhydroxy-polyalkylene polyether modified with a styrene-acrylonitrile copolymer. The graft polyols are familiar classes of substances which are normally used for the manufacture of polyurethanes. Processes for their manufacture are described, for instance, in U.S. Pat. Nos. 3,383,351, 3,304,273, 3,523,083, 3,110,695, 3,652,639, 3,823,201 and German Pat. No. 1,152,536.

The graft polyols are manufactured by polymerization of a mixture of styrene and acrylonitrile, for instance, 5 to 60 percent by weight in a weight ratio between 90:10 to 30:70 in a polyhydroxyl-polyalkylene polyether, for instance, 40 to 95 percent by weight, in a mole weight range of 500 to 10,000.

The polyhydroxy-polyalkylene polyethers contain at least 2, preferably 2 to 3 hydroxyl groups, and are produced by polymerization of an epoxide such as ethylene oxide and/or propylene oxide in the presence of $BF_3$ or other commonly used acid or alkaline catalysts or by addition of these epoxides in blocks or heteric mixtures to initiators having reactive hydrogen atoms such as water, alcohols, ammonium and amines. Useful are alcohols such as propylene glycol, trimethylol propane, pentaerythritol, and glycerine. Also useful are sucrose, dihydroxydiphenyl methane, aniline, ethanolamine and ethylene diamine. Preferably used are polyhydroxy-polyalkylene polyethers having an average molecular weight between 500 and 10,000, preferably 1000 and 7000.

As a result of their manufacture, the polyhydroxy-polyalkylene polyethers usually contain slight quantities of olefinic doublebonds, in the range between 0.001 and 0.01 doublebonds per molecule. This amount can, however, be increased on a preferred basis by also using small quantities of condensible compounds having ethylenic unsaturation in the manufacturing process, for instance, by using unsaturated epoxides such as 1-vinyl-cyclohexane-3,4-epoxide, butadiene monoxide, glycidyl vinyl ether, glycidyl methacrylate and allyl glycidyl ether, and/or by incorporating in the polyhydroxy-polyalkylene polyethers an unsaturated carboxylic acid or its anhydride. In this manner polyethers can be produced which contain more than 0.01, perhaps even more than 1 doublebond per molecule.

The graft polyols used as the antistatic agent of this invention are usually highly viscous suspensions with a solids content of approximately 5 to 65 percent by weight styrene acrylonitrile copolymer and which also contains certain amounts of polyhydroxy-polyalkylene polyethers which are incorporated as a result of the grafting reaction.

The antistatic agent of this invention is mixed into the molding masses by known methods such as combined extrusion, kneading or rolling of the components. The incorporation can take place at the same time at which additional additives or auxiliaries are admixed. These include fillers, glass fibers, additional compatible plastics, dyes, pigments, antioxidants, flame retardants, lubricants and mold release agents.

The molding masses of this invention are processed into finished parts by known thermoplastic manufacturing processes. They are useful for housing of electrical devices, appliances, telephones, records, tubes, toys and furniture.

The finished parts are characterized by a surface which is free of coatings, high impact strength and thermal stability when exposed to heat. They are free of clouding and discoloration. They are largely antistatic and display these properties even after prolonged usage and repeated washing.

The following examples will further illustrate the various aspects of the invention. Where not otherwise specified throughout this specification and claims, temperatures are in degrees centigrade and parts, percentages and proportions are by weight.

The notched impact strength was determined according to DIN 53 453 at 23° C. using standard, small rods, produced at 250° C., and the softening point was determined according to Vicat in accordance with DIN 53 460/B and the melting index was determined according to DIN 53 735.

In order to examine the processability, 50 grams of the mixture were in case applied to a lab roller set (225×10 millimeters×Berstorf) and were processed into an approximately 400 micron thick foil at 200° C., working the material for 5 minutes at 15 rpm. The homogeneity of the melt and the surface quality of the foil were evaluated.

In order to determine the dust adhesion, pressed panels having dimensions of 160×160×2 millimeters were produced at 200° C. One panel is introduced into a dust chamber in which the dust is stirred up by blowing air into the chamber. One additional panel is stored in an area having a relative humidity of 30 to 50 percent. After certain time intervals the panels are checked for the formation of dust flowers on their surfaces.

In order to examine the samples for the formation of a surface coating caused by antistatic agents diffusing through to the surface, pressed panels having dimensions of 50×80×2 millimeters were produced at 200° C. The pressed panels were stored in a chamber with tropical climate conditions at 40° C. The samples were tested visually after certain time intervals in order to determine if a surface coating had formed.

EXAMPLES AND COMPARISON EXAMPLES

The examined molding masses were produced by mixing the copolymer with the antistatic agent and approximately 0.2 percent by weight of a phenolic antioxidant at approximately 250° C. in a degassing mixing extruder and by subsequent extrusion and granulation.

The following copolymers were used:
I. ABS—a mixture of 55 percent styrene-acrylonitrile copolymer having an acrylonitrile content of 35 percent by weight and a viscosity number of 80 milliliters per gram and 45 percent of a graft copolymer produced by polymerization of 60 parts polybutadiene rubber, having a particle size of approximately 0.3 microns and 40 parts of styrene-acrylonitrile (weight ratio 70:30).
II. Styrene-acrylonitrile copolymer having an acrylonitrile content of 25 percent by weight and a viscosity number of 85 ml/g.
III. Styrene-acrylonitrile copolymer having an acrylonitrile content of 35 percent by weight and a viscosity number of 80 ml/g.
IV. α-methylstyrene-acrylonitrile copolymer having an acrylonitrile content of 30 percent by weight and a viscosity number of 55 ml/g.
V. α-methylstyrene-styrene-acrylonitrile terpolymer having a styrene content of 20 percent by weight and an acrylonitrile content of 25 percent by weight and a viscosity number of 52 ml/g.
VI. Mixture of 60 parts of a styrene-acrylonitrile copolymer containing 35 percent by weight acrylonitrile and a viscosity number of 80 ml/g and 40 parts of an α-methylstyrene acrylonitrile copolymer having 30 percent by weight acrylonitrile and a viscosity number of 55 ml/g.

VII. Styrene-acrylonitrile copolymer containing 30 percent by weight acrylonitrile and a viscosity number of 70 ml/g.

The compositions of the antistatic agents are as follows:

A. (Of the invention)
  A polyhydroxy-polyalkylene polyether having a molecular weight of 5100, an OH number of 26.5, produced by the combined addition of propylene oxide and ethylene oxide to glycerine with a addition of glycerine monoallylether, modified by mixing 80 parts of the polyether with 10 parts of styrene and 10 parts of acrylonitrile and by polymerizing the mixture.

B. (Not of the invention)
  Propylene glycol having an average molecular weight of 2000.

C. (Not of the invention)
  Bishydroxyethyl stearyl amine.

D. (Not of the invention)

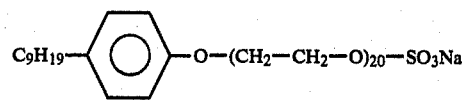

(In accordance with German Published Application No. 2,935,835.)

E. (Not of the invention)
  Mixture of 80 percent by weight of N,N-bis(2-hydroxyethyl)-$C_{18}$-alkyl amine and 20 percent by weight of polypropylene glycol having an average mole weight of 1500 (in accordance with U.S. Pat. No. 3,625,915, Example 4).

F. (Not of the invention)
  Mixture of 75 percent by weight of N,N-bis(2-hydroxyethyl)-$C_{12}$-alkyl amine and 25 percent by weight of polypropylene glycol having an average molecular weight of 1200 (in accordance with U.S. Pat. No. 3,625,915).

The test results were compiled in Tables 1 and 2.

TABLE 1

| | Copolymer | Antistatic Agent % by weight | Softening Point According to Vicat [°C.] | Melting Index at 21.6 Kp [q/10 Mins.] | Notched Impact Strength [kJ/m$^2$] | Dust Accumulation, Formation of Dust Flower | | Development Of Surface Coating After 30 Days | Roller Test |
|---|---|---|---|---|---|---|---|---|---|
| | | | | | | After 30 Mins. In A Dust Chamber | After 30 Days In a Room | | |
| Examples | | | | | | | | | |
| 2 | I | A 0.1 | 96 | 3.1 | 20.2 | no | no | no | (1) |
| 2 | I | A 0.2 | 96 | 3.3 | 21.0 | no | no | no | (1) |
| 3 | I | A 0.3 | 97 | 3.2 | 21.0 | no | no | no | (1) |
| 4 | I | A 0.4 | 95 | 3.4 | 23.4 | no | no | no | (1) |
| 5 | I | A 0.6 | 94 | 3.9 | 20.8 | no | no | no | (1) |
| 6 | I | A 0.8 | 96 | 6.0 | 21.0 | no | no | no | (1) |
| 7 | I | A 1 | 96 | 10.5 | 21.0 | no | no | no | (1) |
| Comparison Examples | | | | | | | | | |
| 8 | I | B 0.1 | 97 | 2.9 | 20.3 | yes | yes | no | (1) |
| 9 | I | B 5 | 94 | 3.0 | 18.2 | no | no | no | (2) |
| 10 | I | C 1 | 95 | 3.5 | 20.4 | yes | no | yes | (1) |
| 11 | I | D 0.5 | 96 | 3.1 | 19 | yes | yes | no | (1) |
| 12 | I | — | 96 | 3.1 | 20.2 | yes | yes | yes | (1) |

(1) homogeneous
(2) not homogeneous

TABLE 2

| | Copolymer | Antistatic Agent % by weight | Softening Point According to Vicat [°C.] | Melting Index at 21.6 Kp [q/10 Mins.] | Notched Impact Strength [kJ/m$^2$] | Dust Accumulation, Formation of Dust Flower | | Development Of Surface Coating After 30 Days | Roller Test |
|---|---|---|---|---|---|---|---|---|---|
| | | | | | | After 30 Mins. In A Dust Chamber | After 30 Days In a Room | | |
| Examples | | | | | | | | | |
| 13 | II | A 0.05 | 104 | 30.2 | 3.8 | no | no | no | (1) |
| 14 | II | A 0.1 | 104 | 30.4 | 3.7 | no | no | no | (1) |
| 15 | II | A 0.5 | 104 | 32.1 | 3.8 | no | no | no | (2) |
| 16 | III | A 0.1 | 105 | 25.3 | 3.3 | no | no | no | (1) |
| 17 | IV | A 0.1 | 116 | 7.2 | 4.5 | no | no | no | (1) |
| 18 | V | A 0.1 | 109 | 14.3 | 3.8 | no | no | no | (1) |
| 19 | VI | A 0.1 | 109 | 17.3 | 3.9 | no | no | no | (1) |
| Comparison Examples | | | | | | | | | |
| 20 | II | E 2.5 | 101 | 38.3 | 3.1 | yes | no | no | (2) |
| 21 | VII | F 2.0 | 101 | 33.5 | 3.0 | yes | no | yes | (2) |
| 22 | II | D 0.5 | 102 | 33.0 | 3.5 | yes | yes | no | (1) |

(1) homogeneous
(2) not homogeneous

The embodiments of the invention in which an exclusive privilege or property is claimed are defined as follows:

1. An antistatic thermoplastic molding material comprising a copolymer of styrene and/or α-methylstyrene and acrylonitrile and, as an antistatic agent, from 0.01 percent by weight to 1.5 percent by weight of a graft polyol prepared by polymerization of a styrene-acrylonitrile mixture in a polyhydroxy polyalkylene polyether said polyether having a molecular weight of 500 to 10,000 and being obtained by the addition reaction of an alkylene oxide having 2 to 3 carbon atoms with a di- or trifunctional initiator molecule.

2. The molding material of claim 1 wherein the antistatic agent is produced by polymerization of a mixture of 5 to 60 percent by weight of styrene/acrylonitrile in a weight ratio of 90:10 to 30:70 and 40 to 95 percent by weight of a polyhydroxyl polyalkylene polyether.

3. The molding material of claim 1 wherein the copolymer is styrene and/or α-methylstyrene and 8 to 50 percent by weight of acrylonitrile based on the weight of the copolymer.

4. The molding materials of claim 1 wherein the copolymer is styrene and/or α-methylstyrene and acrylonitrile modified to be impact resistant with rubberlike polymers.

5. The process of suppressing dust accumulation which comprises incorporating in a thermoplastic molding material based on a copolymer of styrene and/or α-methylstyrene and acrylonitrile from 0.01 percent by weight to 1.5 percent by weight of an antistatic agent according to claim 1.

6. The process of claim 5 wherein the copolymer of styrene and/or α-methylstyrene and acrylonitrile is impact resistance modified with a rubberlike polymer.

7. The antistatic thermoplastic molding material of claim 1 which further contains an antioxidant.

* * * * *